United States Patent
Lenz et al.

(10) Patent No.: US 9,776,611 B2
(45) Date of Patent: Oct. 3, 2017

(54) METHOD FOR CONTROLLING A PNEUMATIC BRAKE SYSTEM AND A PNEUMATIC BRAKE SYSTEM FOR A VEHICLE

(71) Applicant: WABCO GmbH, Hannover (DE)

(72) Inventors: Thomas Lenz, Lehrte (DE); Gerd Roters, Wunstorf (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 14/946,928

(22) Filed: Nov. 20, 2015

(65) Prior Publication Data

US 2016/0152222 A1 Jun. 2, 2016

(30) Foreign Application Priority Data

Nov. 28, 2014 (DE) .......................... 10 2014 017 683

(51) Int. Cl.
| | |
|---|---|
| *B60T 11/34* | (2006.01) |
| *B60T 11/28* | (2006.01) |
| *B60T 8/50* | (2006.01) |
| *B60T 13/26* | (2006.01) |
| *B60T 13/68* | (2006.01) |
| *B60T 8/176* | (2006.01) |
| *B60T 15/02* | (2006.01) |

(52) U.S. Cl.
CPC .............. *B60T 11/28* (2013.01); *B60T 8/176* (2013.01); *B60T 8/5006* (2013.01); *B60T 13/26* (2013.01); *B60T 13/683* (2013.01); *B60T 15/027* (2013.01)

(58) Field of Classification Search
CPC ...... B60T 8/361; B60T 8/4818; B60T 8/5012; B60T 8/90; B60T 17/18; B60T 17/228; B60T 8/3605; B60T 8/3675; B60T 13/68

USPC .......... 303/7, 33, 42, 57, 66, 69, 82, 83, 86, 303/127; 137/112, 627.5
See application file for complete search history.

(56) References Cited

U.S. PATENT DOCUMENTS 3,006,696 A * 10/1961 Yarber .................... B60T 8/34
303/118.1
3,853,357 A * 12/1974 Hitzelberger ......... B60T 8/5012
188/181 A (Continued)

FOREIGN PATENT DOCUMENTS

| DE | 196 10 665 A1 | 9/1997 |
|---|---|---|
| DE | 102 32 792 A1 | 2/2004 |

(Continued)

OTHER PUBLICATIONS

English language abstract and machine translation of EP2754594A1 extracted from http://worldwide.espacenet.com database on Feb. 13, 2017, 46 pages.

(Continued)

*Primary Examiner* — Christopher Schwartz
(74) *Attorney, Agent, or Firm* — Brinks Gilson & Lione

(57) ABSTRACT

The application discloses a method for controlling a pneumatic brake system of a vehicle. The method includes the step of modulating a pilot-control brake pressure by means of an electropneumatic pilot-control valve in venting phases and bleeding phases. The method also includes the step of feeding in the pilot-control pressure via a pilot-control line for outputting a brake pressure to wheel brakes of the vehicle.

20 Claims, 6 Drawing Sheets

(56) References Cited

U.S. PATENT DOCUMENTS

| | | | |
|---|---|---|---|
| 3,944,290 A * | 3/1976 | Goebels | B60T 8/361 303/118.1 |
| 3,977,734 A * | 8/1976 | Ronnhult | B60T 8/3605 137/627.5 |
| 4,962,975 A * | 10/1990 | Kervagoret | B60T 8/4291 303/115.4 |
| 5,037,161 A * | 8/1991 | Tackett | B60T 8/341 137/112 |
| 5,207,482 A * | 5/1993 | Hart | B60T 17/228 303/33 |
| 5,234,265 A * | 8/1993 | Tyler | B60T 8/00 303/118.1 |
| 5,350,222 A * | 9/1994 | Carroll | B60T 17/228 303/33 |
| 5,667,285 A * | 9/1997 | Seetharaman | B60T 8/341 303/116.2 |
| 5,815,362 A | 9/1998 | Kahr et al. | |
| 6,371,573 B1 | 4/2002 | Goebels | |
| 6,820,945 B2 | 11/2004 | Woerner et al. | |
| 6,984,005 B2 | 1/2006 | Meyer et al. | |
| 7,020,551 B2 * | 3/2006 | Goebels | B60R 16/0233 280/5.502 |
| 8,708,430 B2 * | 4/2014 | Bensch | B60T 8/1708 188/158 |
| 8,731,795 B2 | 5/2014 | Frashure et al. | |
| 8,820,857 B2 * | 9/2014 | Eberling | B60T 13/385 188/151 A |
| 8,870,299 B2 | 10/2014 | Wieder et al. | |
| 2009/0280959 A1 * | 11/2009 | Bensch | B60T 8/1708 477/198 |
| 2012/0173112 A1 * | 7/2012 | Bensch | B60T 7/20 701/78 |
| 2013/0092483 A1 * | 4/2013 | Eberling | B60T 13/385 188/170 |
| 2016/0304070 A1 * | 10/2016 | Wieder | B60T 13/686 |

FOREIGN PATENT DOCUMENTS

| | | |
|---|---|---|
| DE | 102008048207 A1 | 6/2010 |
| DE | 10 2009 053 815 B4 | 5/2011 |
| DE | 10 2011 115 128 B4 | 4/2012 |
| EP | 0 844 155 B1 | 5/1998 |
| EP | 1 347 908 B1 | 10/2003 |
| EP | 2570316 A1 | 3/2013 |
| EP | 2754594 A1 | 7/2014 |

OTHER PUBLICATIONS

English language abstract and machine translation of DE102008048207A1 extracted from http://worldwide.espacenet.com database on Feb. 13, 2017, 23 pages.

English language abstract and machine translation of EP2570316A1 extracted from http://worldwide.espacenet.com database on Feb. 13, 2017, 32 pages.

* cited by examiner

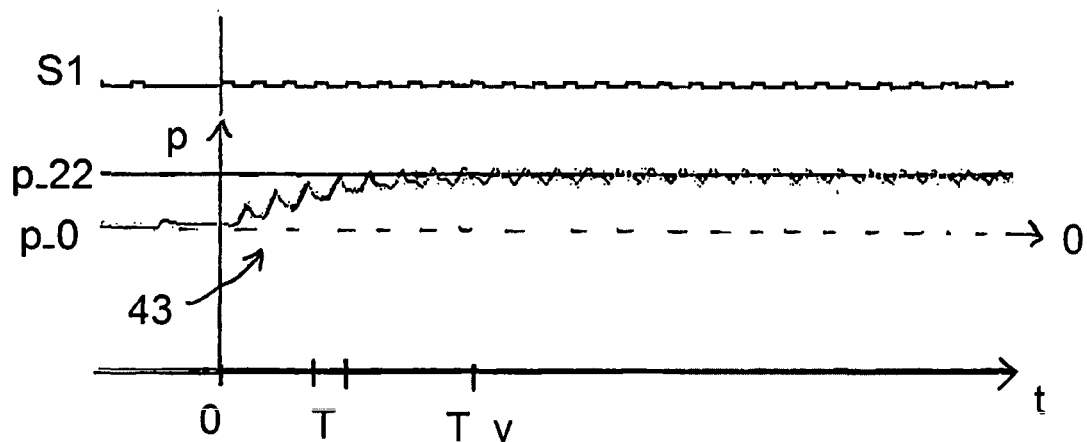
Fig. 2
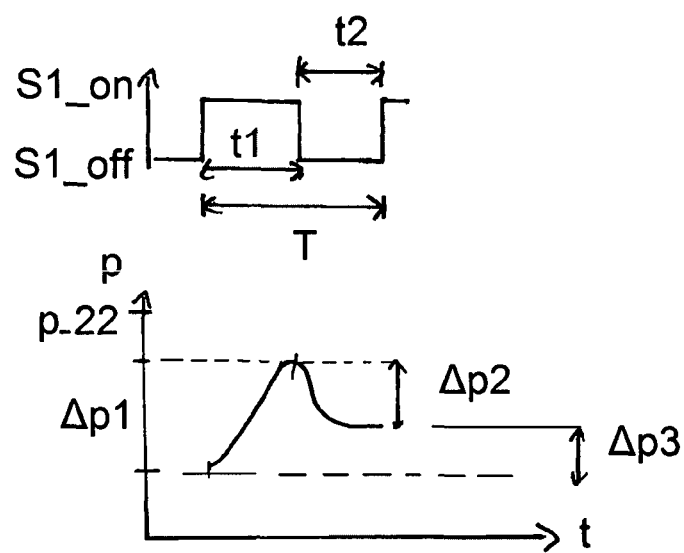

METHOD FOR CONTROLLING A PNEUMATIC BRAKE SYSTEM AND A PNEUMATIC BRAKE SYSTEM FOR A VEHICLE

CROSS-REFERENCE TO RELATED APPLICATIONS

This application claims the benefit of DE 10 2014 017 683.5 filed on Nov. 28, 2014, the disclosure of which is incorporated herein by reference in its entirety.

BACKGROUND OF THE INVENTION (1) Field of the Invention

The invention relates to a method for controlling a pneumatic brake system and for operating a pneumatic brake system, and such a pneumatic brake system for a vehicle.

The method is provided, in particular, for carrying out an automatic control process or an automatically initiated control process.

(2) Description of Related Art

Electropneumatic brake systems generally have an electronic control device (ECU), pneumatic wheel brakes, compressed air accumulators for a plurality of brake circuits and suitable electropneumatic and pneumatic valves.

In what are referred to as EBS systems, the brake pressure which is output to the pneumatic wheel brakes is modulated electrically by means of the electronic control device; if appropriate it is possible to provide a pneumatic fallback level in case the electrical actuation fails. However, such EBS systems are generally relatively complex.

Electropneumatic brake systems without such completely electronic actuation are also referred to as ABS systems and generally have, immediately upstream of the wheel brakes, check valves, also referred to as ABS check valves, and also a pilot-control valve device for actuating the ABS check valves. The ABS check valves are actuated by the pilot-control valve device and can then assume their various operating phases; these are increasing the pressure, i.e. an open position,
maintaining the pressure, i.e. a closed position, and
reducing the pressure, which can take place in a bleeding position by bleeding the brake lines to the wheel brakes, or else in an open position by reducing the pilot-control pressure via the pilot-control valve device, in order to set the brake pressure at the wheel brakes. In this context, generally direct actuation of the ABS check valves is additionally possible via a brake valve which is connected to the brake pedal.

DE 10 2011 115 128 B4 presents such a brake system and a method for controlling or operating such a brake system. In this context, a pressure is input into wheel brakes which are switched on and off alternately via electrical actuation of the control device, in order to set a desired braking behavior, in particular for ACC (automatic cruise control) as an automatic control method.

DE 102 32 792 A1 describes a braking method for a vehicle which is equipped with an anti-lock brake system (ABS) and a traction control system (TCS) as well as also automatic braking means such as an ACC system and a rollover prevention system (RSC). In this context, a brake pressure distribution occurs between driven and non-driven axles. The brake pedal passes on pressure to ABS check valves of the wheel brakes via a brake valve.

DE 10 2009 053 815 B4 describes a service brake device of a vehicle, in which service brake device a test run for the valves is provided. The brake system has a pressure-inputting 3/2 way valve, brake cylinders and ABS pressure control valves, each with an inlet valve and an outlet valve.

EP 844 155 B1 describes a further pneumatic EBS brake system.

Furthermore, basically methods for actuating valves by means of pulse width modulation (PWM) are known. DE 196 106 65 C2, EP 134 7908 B1 and U.S. Pat. No. 5,815,362 A1 describe specific PWM signals.

PWM actuation permits energization by means of periodic switching on and off of the current. In this context, a pulse frequency or period is predefined in which the pulse width of the switch-on pulse and correspondingly the subsequent pulse width of the switch-off pulse can be varied, in order to be able to set currents or power levels between a minimum value and a maximum value. When electromagnetic valves or solenoid valves are actuated, an armature, which is to be adjusted, of the valve can therefore be held in a floating state, in order to continuously hold this central position between a minimum value and a maximum value. The PWM actuation therefore serves to replace a median voltage value, since median voltage values which are to be set in an analogous fashion can generally be produced only by means of, for example, potentiometer circuits or other circuits which are subject to loss.

BRIEF SUMMARY OF THE INVENTION

The invention is based on the object of providing a method for controlling a brake system and such a brake system for a vehicle, which method and brake system permit safe actuation of the wheel brakes at relatively low cost.

This object is achieved by means of a method as claimed in claim 1 and a brake system as claimed in claim 14. The dependent claims describe preferred developments.

The brake system according to the invention is provided, in particular, for carrying out the method according to the invention.

According to the invention a pilot-control valve is therefore modulated in venting phases and bleeding phases in such a way that it outputs a pilot-control pressure to a pilot-control line. It is to be appreciated that the terms vent, venting, or vented as used herein indicate the introduction, feeding, or delivery of air and can also be referred to as aerate, aerating, or aerated. Additionally, the terms bleed, bleeding, or bled as used herein indicate the removal or exhausting of air and can also be referred to as deaerate, deaerating, or deaerated. As a result, in the closed pilot-control line, a median pilot-control pressure can be set between a minimum value and a maximum value, in particular between a pressureless state and a supply pressure, in alternating venting phases and bleeding phases.

The pilot-control pressure which is set in this way is subsequently output, in particular, directly or indirectly to a check valve, for example ABS check valve, which is connected upstream of a wheel brake. For example a select-high valve and/or a relay valve can be connected between the pilot-control valve and the check valve.

It is therefore possible for a median pressure value or a median pilot-control pressure already to be output to the pilot-control line, with the result that the check valves can subsequently modulate the brake pressure on the basis of this median supply pressure, instead of the high supply pressure.

This already provides a number of advantages. It is therefore possible for the switching times of the check valves to be decreased compared to actuation with a high supply pressure; and the brake pressure to the wheel brakes can as a result be set more precisely.

The pilot-control valve is embodied, in particular, as a 3/2 way valve which is actuated electrically by the brake control device. In this context it is advantageously connected by its input connection to a feed line of the compressed air accumulator, by its first output connection to the pilot-control line and by its other output connection to a compressed air outlet, in particular a bleeding means. A 3/2 way pilot-control valve which is embodied in this way can therefore merely vent the pilot-control line in order to increase the pressure and bleed it in order to reduce the pressure. However, here it can be embodied more cost-effectively and solidly.

By virtue of the fact that the 3/2 way pilot-control valve is actuated, for example, to initiate the automatic braking from a pressureless state by means of a plurality of successive switching periods, respectively by a switch-on and a switch-off time, the median pilot-control pressure (median pilot-control pressure level to be set) is therefore applied or achieved intermittently, in particular in decreasing pressure steps or with a decreasing difference. Therefore, a plurality of successive venting phases and bleeding phases advantageously take place in this setting time, instead of direct venting or venting in order to quickly reach the pilot-control pressure.

The setting time is therefore preferably longer than the switching period and can have, in particular, more than two switching periods.

This delay and the compressed air loss of the switch-off times or bleeding times, which occur during this setting time, are intentionally accepted according to the invention; it is recognized that a median pilot-control pressure which is set as a result permits significant advantages for the check valves connected downstream.

Furthermore, this embodiment can advantageously be combined with a select-high valve which is connected to the pilot-control valve and additionally receives a driver control line from a brake valve which is modulated by the driver's brake pedal. When a relatively high driver's braking request is present, it is therefore possible for this driver brake pressure to be actuated directly and for the control which is modulated by the electric control device to be, as a result, overcome or suppressed as subordinate. Since with such a method the relevant clocking advantageously no longer has to be carried out at the ABS check valves, the driver can therefore directly output a suitable median pilot-control pressure level to the ABS check valves, which can modulate this pilot-control pressure level directly.

In contrast to, for example, the case of PWM actuation of solenoids, the pilot-control signal therefore serves, with its switch-on times and switch-off times, not for setting a floating state or median level but rather actually for carrying out switch-on times and switch-off times and by mechanical adjustment of an internal armature.

In the switch-on times, the pilot-control valve is advantageously modulated, in particular completely modulated, in its venting position in such a way that venting and therefore increasing of the pressure of the pilot-control line takes place. In the switch-off times or bleeding times, the pressure in the pilot-control line is correspondingly also reduced. The pilot-control valve is advantageously switched completely into its bleeding position here.

Pilot-control operations of the ABS check valves which also subsequently permit precise and safe control processes can therefore also be achieved by means of an ABS brake system.

It is therefore possible to initiate automatic brake control methods, i.e. without the presence of a driver's request or independently of driver's braking request signals which are present. These control methods are, in particular, an ACC, or automatic cruise control, method, an electronic stability program for preventing vehicle instabilities, in particular preventing skidding and/or rolling, i.e. preventing undesired yawing movements and rolling movements, furthermore also automatic brake initiation systems for pre-crash braking when an imminent crash or tail-end collision is detected, as well as methods for automatically preventing an accident situation and for sensing one or more further road users, for example an AEBS, and a traction control system (TCS).

Therefore, for the embodiment of the pilot-control valve and also of the ABS check valves it is advantageously possible to provide a hardware embodiment which is known per se, with the result that merely one specific actuation by means of the method takes place.

However, as an alternative to this it is also possible for the pilot-control valve to be configured suitably for this, for example with suitable solenoid springs or suitable springs.

BRIEF DESCRIPTION OF THE SEVERAL VIEWS OF THE DRAWING

The invention will be explained in more detail below by means of a number of embodiments and with reference to the appended drawings, in which:

FIG. 2 shows a time diagram of the pilot-control brake signal and of the pilot-control pressure;

DETAILED DESCRIPTION OF THE INVENTION

Figure 1:
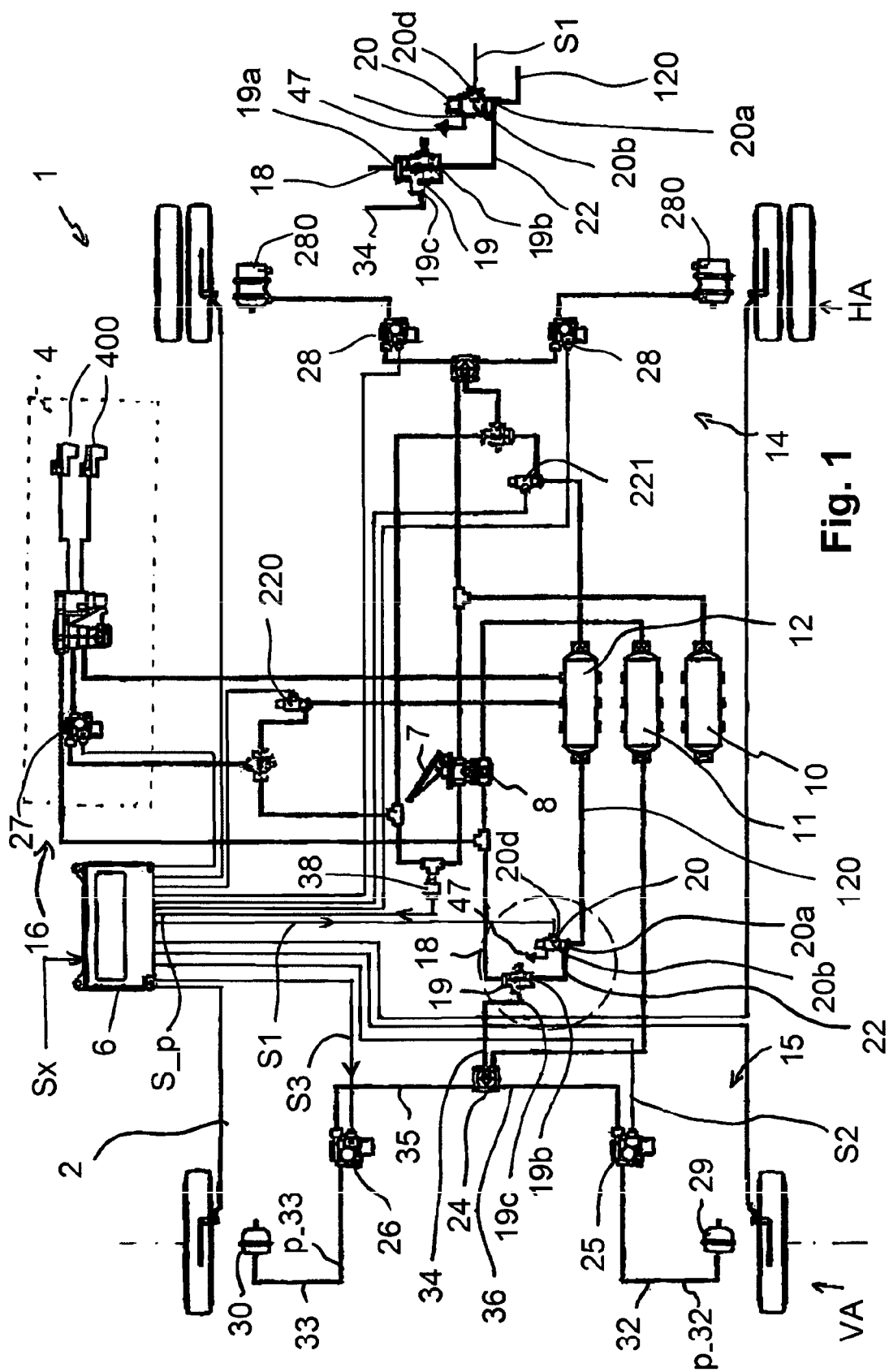
FIG. 1 shows a switching diagram of an electropneumatic brake system of a vehicle, with an enlargement of a detail.

An electropneumatic brake system 1 for a utility vehicle 2 (only indicated here) is part of a compressed air system of the utility vehicle 2, wherein the compressed air system is shown with a compressor, air drier and further valves (not presented in more detail here). The vehicle 2 has a front axle VA and a rear axle HA; basically, the utility vehicle 2 can also have further axles. A trailer brake system 4 (only indicated here) of a trailer vehicle can be connected in a customary fashion to the electropneumatic brake system 1 of the utility vehicle 2.

The brake system 1 has an electronic brake control device (ECU) 6, a brake pedal 7 with a brake valve 8 which is activated by the brake pedal 7, three compressed air accumulators, specifically a first compressed air accumulator 10 for a first brake circuit 14, here the first brake circuit 14 of the rear axle HA, a second compressed air accumulator 11 for a second brake circuit 15, here the second brake circuit 15 of the front axle VA, and a third compressed air accumulator 12 for a secondary consumer circuit, here, in particular, a third brake circuit 16 for the trailer brake system 4. As shown, the compressed air accumulators 10, 11 and 12 can each also be used to extract control pressure for the respective other brake circuits 14, 15 and 16.

In particular, the second brake circuit 15 of the front axle VA will be considered below; the first brake circuit 14 of the rear axle HA is basically of corresponding design; a secondary consumer circuit which is provided as an auxiliary brake circuit or third brake circuit 16 for the trailer brake system 4 has, in contrast, if appropriate a number of structural modifications which are explained below. The method for controlling and operating the brake system 1 can advantageously be carried out for one brake circuit, a plurality of brake circuits or all the brake circuits 14, 15 and 16 of the brake system 1.

The brake valve 8 directs, as a function of the activation of the brake pedal 7, compressed air from the second compressed air accumulator 11 to a driver control line 18 to which a select-high valve 19 is connected by a first input 19a; a pilot-control valve 20, embodied as a 3/2 way valve, is also connected by its input connection 20a to the third compressed air accumulator 12 (or basically also another compressed air accumulator) via a compressed air feed line 120, wherein a first output connection 20b is connected to a pilot-control line 22 which is in turn connected to a second input 19b of the select-high valve 19. Furthermore, a bleeding means 47 is provided on the pilot-control valve 20, either already integrated in the pilot-control valve 20 (shown in FIG. 3), for example as a bleeding cap 20c or as a further connection to a common bleeding means of the brake system 1 or of the front-axle brake circuit 15. It is to be appreciated that the terms vent, venting, or vented as used herein indicate the introduction, feeding, or delivery of air and can also be referred to as aerate, aerating, or aerated. Additionally, the terms bleed, bleeding, or bled as used herein indicate the removal or exhausting of air and can also be referred to as deaerate, deaerating, or deaerated.

One output 19c of the select-high valve 19 leads via a second pilot-control line 34 and a relay valve 24 as well as modulation brake lines 35, 36 to two ABS check valves 25 and 26, to which in turn pneumatic wheel brakes (brake cylinders) 29 and 30 of the front axle VA are connected via brake lines 32, 33.

The relay valve 24 serves—in a customary fashion—merely to increase the connected quantity of compressed air: The pilot-control pressure p_34 which is fed through the brake control line 34 controls the relay valve 24, with the result that supply pressure is output from the second compressed air accumulator 11 to the modulation brake lines 35 and 36 as a function of this actuation, advantageously in a direct proportional dependence or as a proportional increase of the air stream.

The pilot-control valve 20 receives, with its electrical control input 20d, pilot-control signals S1 from the brake control device 6. The ABS check valves 25 and 26 correspondingly receive brake signals S2 and S3 from the brake control device 6.

In the embodiment in FIG. 1, the first brake circuit 14 of the rear axle HA is correspondingly embodied with a pilot-control valve 220, a select-high valve 191 and ABS check valves 26, which are actuated by the pilot-control valve 220 with a pilot-control pressure p_220. Correspondingly, in the third brake circuit 16 for the trailer brake system 4, an ABS check valve 27 is provided which is actuated by a pilot-control valve 221 with a pilot-control pressure p_221 via a select-high valve 190, i.e. corresponding to the second brake circuit 15 of the front axle VA.

However, the invention can basically also be implemented without the intermediate connection of a check valve, with the result that the pilot-control pressure p_22, p_220 and/or p_221 is fed directly to the wheel brakes as a brake pressure.

Figure 4:
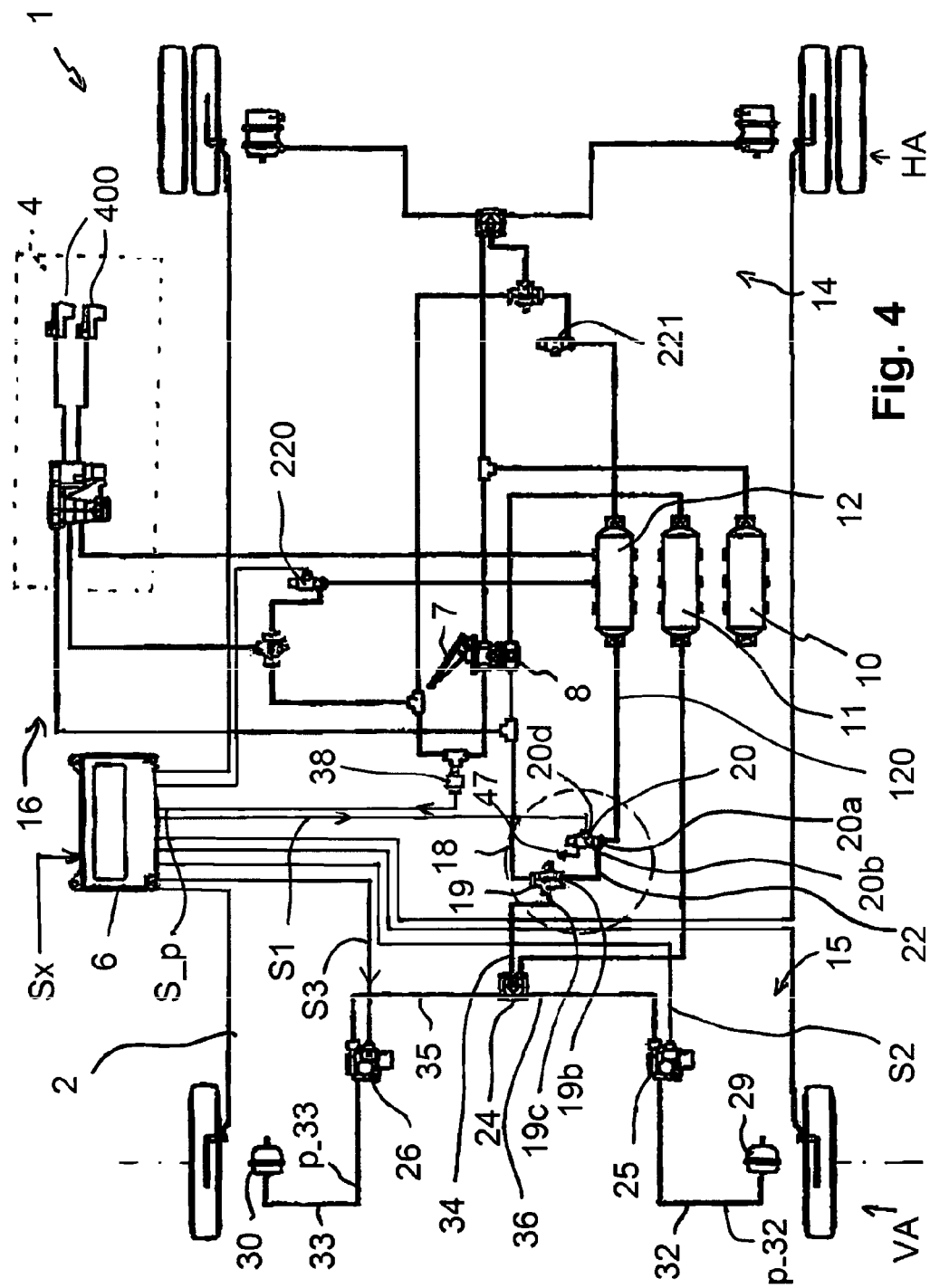
FIG. 4 shows an alternative embodiment to FIG. 1 of an electropneumatic brake system having a trailer brake system without check valves.

FIG. 4 shows such an embodiment in which no check valves are provided in the third brake circuit 16 of the trailer brake system or in the brake circuit 14 of the rear axle HA.

Figure 5:
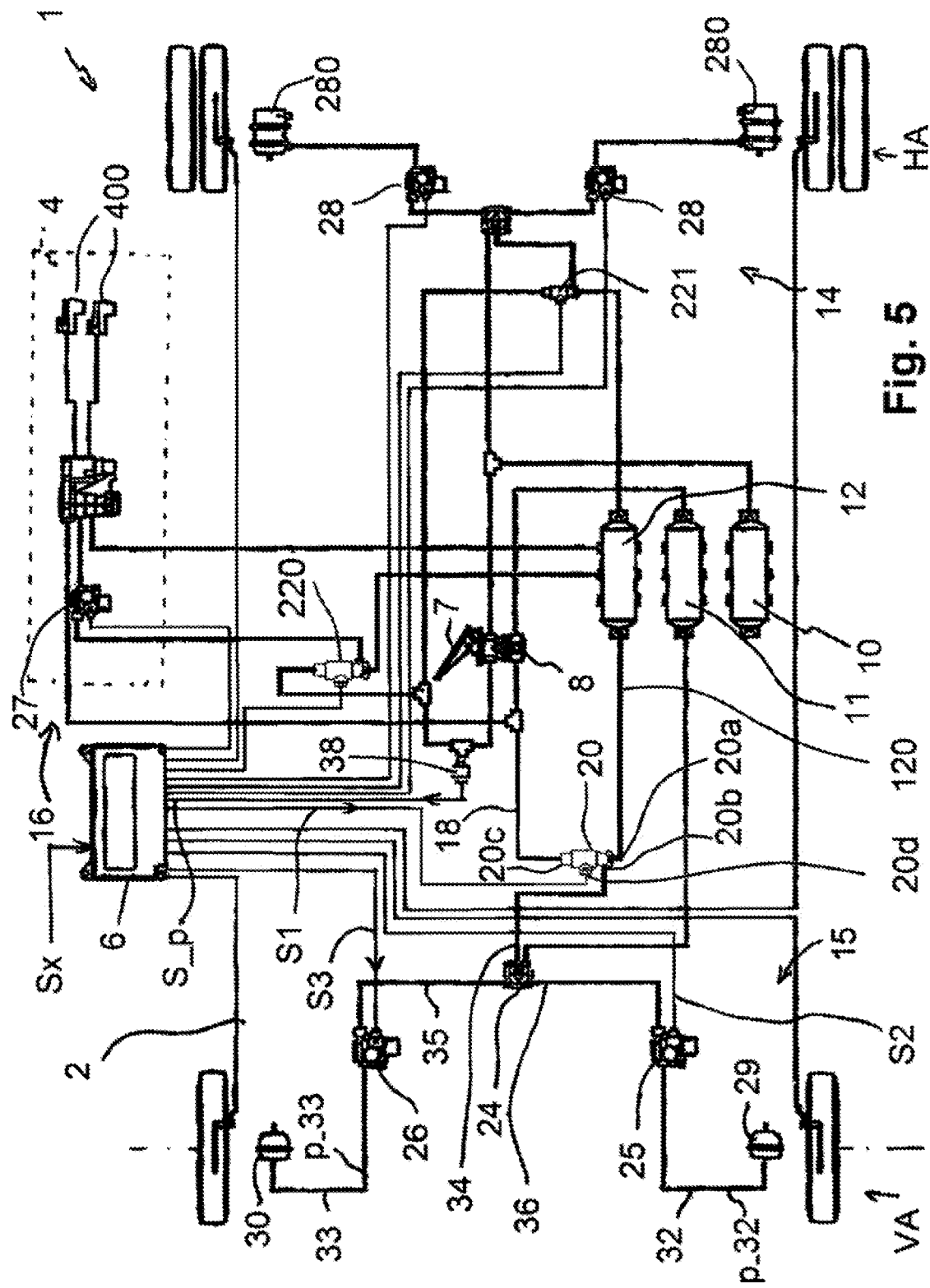
FIG. 5 shows a further embodiment of an electropneumatic brake system without a select-high valve.

FIG. 5 shows another embodiment in which the brake circuits 14, 15 and 16 are embodied without the select-high valves 19, 190, 191 shown in FIG. 1.

The ABS check valves 25 and 26 are constructed in a manner known per se; the illustration is presented in a generalized form here as an electrically actuated 2/2 way valve; in general, such ABS check valves 25, 26 have two individual 2/2 way valves which permit bleeding of the brake line 32, 33 which leads from the ABS check valves 25 and 26 to the respective wheel brake 29 or 30. The ABS check valves 25, 26 can therefore also be embodied differently; for their function it is advantageously relevant that they can assume the following operating phases.

Operating phase Bp1: Pressure increase, i.e. in an open position a modulation brake pressure p_35, p_36 is passed through from the modulation brake line 35, 36 to the brake lines 32 and 33, respectively.

Operating phase Bp2: Maintaining pressure or shutting off pressure: The brake pressure p_33, p_32 which is present in the brake line 32 or 33 is maintained and shut in without bleeding the respective brake line 32, 33.

Operating phase Bp3: Reducing pressure/bleeding: The brake pressure p_32, p_33 in the brake line 32 or 33 is reduced by bleeding to the environment.

By means of these three operating phases Bp1 to Bp3, an ABS control method can therefore be carried out directly when a fed-through modulation brake pressure p_35 or p_36 is present, both in the case of automatic braking and in the case of braking which is initiated by the driver; however, automatic control processes when a fed-through modulation brake pressure p_35, p_36 is present can also be carried out by means of the ABS check valves 25 and 26.

The select-high valve 19 serves in the embodiment shown to pass through in each case the higher of the two pressures which are present, i.e. the pilot-control pressure p_22 or the driver control pressure p_18 which is fed-through directly by the driver via the brake pedal 7 and the brake valve 8, and is transmitted to the driver control line 18.

In the case of braking which is initiated by the driver, the driver's braking request is sensed by means of a pressure sensor 38, and therefore a pressure measurement signal is input as a braking request signal S_p to the brake control device 6. The brake control device 6 subsequently controls the pilot-control valve 20 with the pilot-control signals S1 to the effect that compressed air is output from the third compressed air accumulator 12 via the pilot-control line 22 to the select-high valve 19 which also receives the driver brake pressure p18 and passes through the higher of the two values.

For automatic braking, the brake control device 6 receives, for example, a vehicle movement dynamics signal and/or a braking requirement signal Sx via a vehicle-internal data line and calculates an appropriate pilot-control pressure p_22, which can, in particular, also be below a maximum supply pressure p12 or p11 of, for example, 12 bar of the compressed air accumulator 11 or 12 and is denoted below as the median supply pressure p_12_mid and can be, for example, p_12_mid=3 bar. The automatic setting of the median pilot-control pressure p_12_mid is described below with reference to the signal diagram in FIG. 2.

FIG. 2 shows a switch-on process of the pilot-control valve 22 in which the pilot-control valve 22 is modulated from its bleeding position, with the pilot-control line 22 being bled, to the median pilot-control pressure p_12_mid=3 bar. Here, pulsed and temporary switching of the pilot-control valve 20 takes place. The pilot-control valve 20 is alternately switched on and off. The pilot-control signal S1 is switched for this purpose a digital signal with the signal levels S1_off (low voltage level) and S1_on (high voltage level), for example with a fixed switching period T in which in each case a switch-on time t1 with S1=1 and a switch-off time t2 with S1=0 follow one another. According to this embodiment, the switching period T is therefore chronologically constant. Furthermore, according to this embodiment, t1 and t2 are also constant. Therefore, the median pilot-control pressure p_22_mid=3 bar is then set on the pilot-control line 22 by means of a pulsed pilot-control signal S1, and subsequently in a normal case on the relay valve 24 via the select-high valve 19 if no higher driver request is present.

Figure 3:
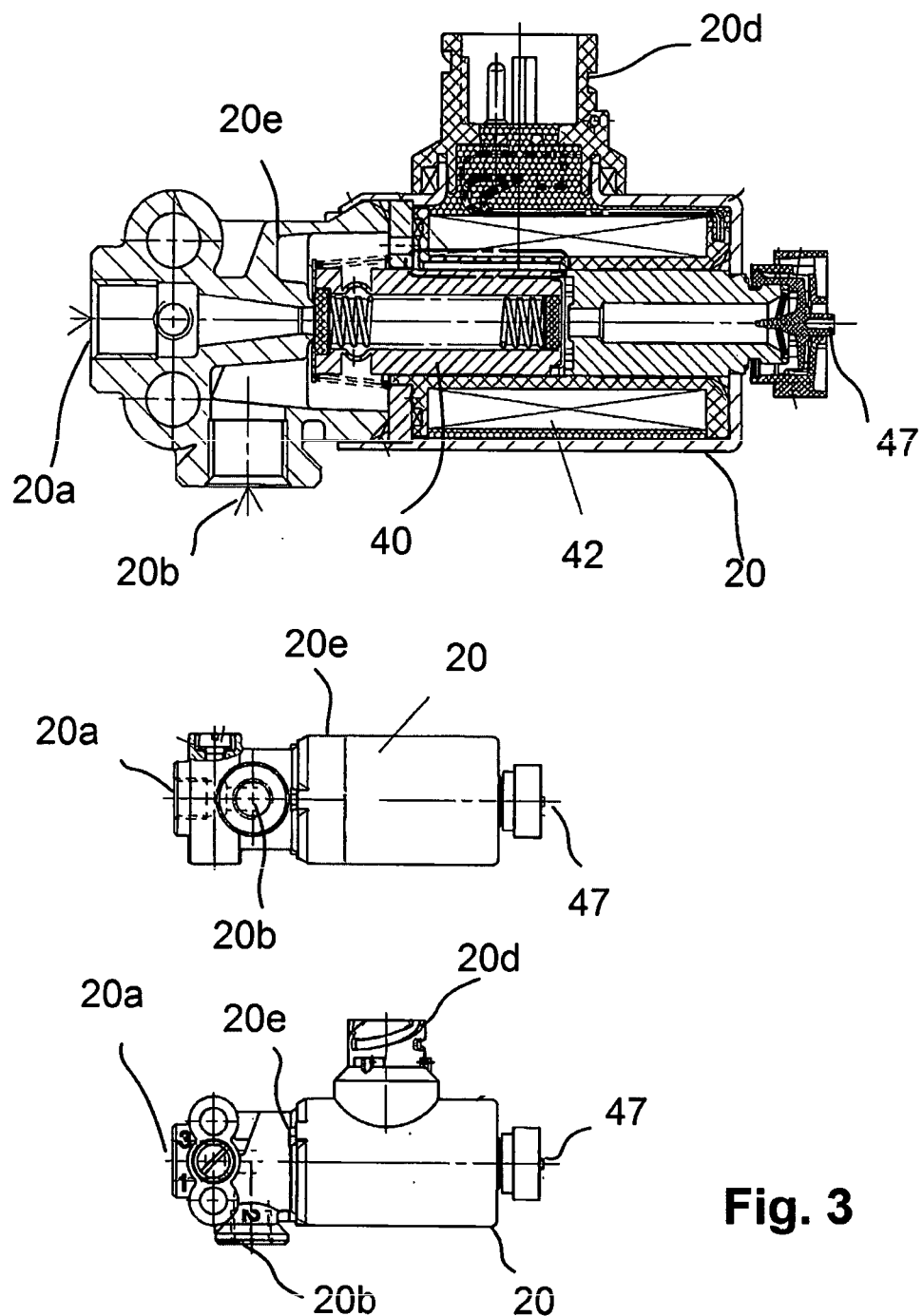
FIG. 3 shows illustrations of the pilot-control valve.

In the switch-on times t1 and the switch-off times t2, an armature 40 which is shown in FIG. 3 is respectively adjusted, i.e. adjusted mechanically, by energization of the solenoid (electromagnet) 42. The pilot-control signal therefore serves not only to set a median voltage value by means of high-speed clocking, and as a result to reach a floating state of the armature 40; instead, the pilot-control valve 20 is actually switched.

In the switch-off times t2, the pilot-control valve 20 is advantageously switched completely into its bleeding position, and subsequently switched completely into its venting position in a switch-on time t1. Compressed air consumption therefore actually occurs in a switching period T, as is also apparent from FIG. 2. Here, a switching period T can lie, for example, in the range from 100 ms to 300 ms, for example it can be T=200 ms. The switch-on times t1 and switch-off times t2 can therefore each be a proportion thereof, for example in the range from 10% to 90% of the switching period T. The switching period T=200 ms is significantly below a total switch-on time T_v=1 s.

The switch-on time T_v therefore comprises more than two, in particular three or more switching periods T.

A gradual, incremental build up of pressure therefore takes place, wherein in the switch-on time T_v the pilot-control pressure p_22 is increased overall in each switching period T by virtue of the fact that the pressure increase delta_p1 in the venting phase t1 of the switching period T is greater than the subsequent pressure reduction delta_p2 in the directly subsequent bleeding phase t2. The difference delta_p1–delta_p2=delta_p3 is in each case a positive pressure increase delta_p3, wherein the positive pressure increase delta_p3 decreases gradually and becomes approximately zero when t=T_v.

The pilot-control valve 20 therefore supplies a pilot-control pressure p_22 and correspondingly, via the select-high valve 19 and the relay valve 24, a modulation brake pressure p_35, p_36 in the modulation brake line 35 to the ABS check valve 26 and correspondingly also to the ABS check valve 25, wherein the modulation brake pressure p_35, p_36 corresponds, when a driver's request is absent, to the median pilot-control pressure p_12_mid, and is, for example, 3 bar. The modulation brake pressure p_35, p_36 can therefore be switched by the ABS check valves 25 and 26 in accordance with its actuation by the brake signals S2, S3. The brake signals S2 and S3 can assume here the three operating phases Bp1, Bp2, Bp3. By virtue of the fact that the ABS check valves 25 and 26 therefore feed through a median pilot-control pressure p_12_mid instead of, as in the case of conventional systems, the supply pressure p11 of the second compressed air accumulator 11, the modulation by the ABS check valves 25 and 26 for the various control methods which are carried out by the brake control device 6 can take place more precisely and with fewer switching processes of the ABS check valves 25 and 26.

Here, in particular the following control methods or automatic control processes can be carried out by means of the brake signals S2 and S3:

Electronic stability programs (ESP, ESC) for stabilizing driving, in particular for preventing vehicle instabilities such as rolling, skidding etc., emergency braking systems for automatically braking when a sufficient collision probability or a risk of a collision is detected, pre-crash brake systems for reducing the consequences of accidents when an imminent collision is detected, traveling in backed-up traffic (ACC Automatic Cruise Control) and further environmentally related automatic braking operations or automatic braking operations relating to the surroundings, furthermore also traction control systems (TCS).

Figure 6:
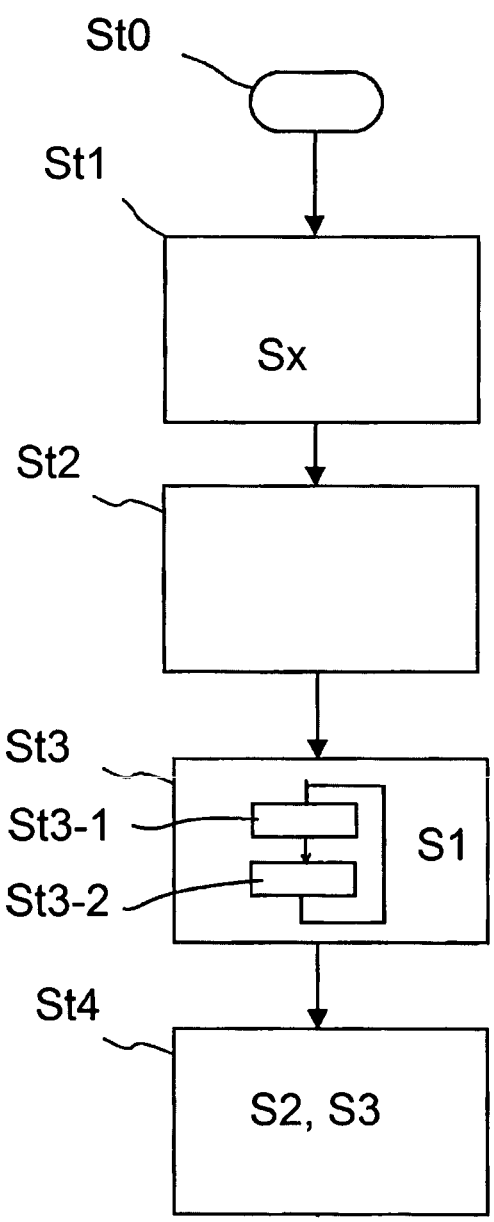
FIG. 6 shows a flow diagram of the method according to the invention.

The method according to the invention therefore also comprises the following steps according to the flow diagram in FIG. 6:

After a start in step St0, for example when the vehicle starts or when the ignition is switched on, in step St1 an automatic vehicle movement dynamics control process or braking control process is subsequently initiated, for example as a function of a surrounding sensor system or other braking requirement signals Sx which are input or received by the brake control device 6, for example a connected data line.

In step St2, a pilot-control brake pressure p_22 is subsequently determined by the brake control device 6, for which purpose the brake control device 6 determines switching periods T and switch-on times t1 as well as switch-off times t2 where t1+t2=T, wherein the values T and t1 are each to be chronologically constant or vary chronologically.

The pilot-control brake pressure p_22 is subsequently modulated in step St3 by outputting the pilot-control signals S1 via the pilot-control valve 22.

In step St3, the pilot-control brake signal S1 is then output correspondingly in the modulation or with switch-on and switch-off times according to FIG. 2, with the result that a pilot-control brake pressure p_22 corresponding to FIG. 2 is subsequently set incrementally or gradually. In subsequent sub-steps St3-1, St3-2, the pilot-control valve 20 is therefore opened in sub-step St3-1 in a venting phase t1 and a pressure increase delta_p1 is achieved in the pilot-control line 22, subsequently in sub-step St3-2 the pilot-control line 22 is bled somewhat in each case in a venting phase t2, and therefore a pressure decrease delta_p2 is achieved which overall result in each case in a pressure increase delta_p3 until the median pilot-control brake pressure p_22_mid is reached.

Furthermore, in step St4 the brake control device 6 can output brake signals S2, S3 to the ABS check valves 25 and 26, with the result that, by suitable clocking, the latter correspondingly set a brake pressure p_32 and p_33 to actuate the wheel brakes 29 and 30.

LIST OF REFERENCE SYMBOLS

1 Electropneumatic brake system
2 Utility vehicle
4 Trailer brake system
6 Electronic brake control device (ECU)
7 Brake pedal
8 Brake valve
10 First compressed air accumulator
11 Second compressed air accumulator 12 Third compressed air accumulator
14 First brake circuit of the rear axle HA
15 Second brake circuit of the front axle VA
16 Third brake circuit for the trailer brake system 4
18 Driver control line
19 Select-high valve
19a First input of the select-high valve 19
19b Second input of the select-high valve 19
19c Output of the select-high valve 19
20 3/2 way valve pilot-control valve
20a Input connection
20b First output connection
20c Bleeding cap or bleeding connection of the pilot-control valve 20
20d Electrical control input of the pilot-control valve 20
22 Pilot-control line
24 Relay valve
25 ABS check valve
26 ABS-check valve
27 ABS check valve
28 ABS check valve
29 Pneumatic wheel brake (brake cylinder) of the front axle VA
30 Pneumatic wheel brake (brake cylinder) of the front axle VA
32 Brake line
33 Brake line
34 Second pilot-control line
35 Modulation brake line
36 Modulation brake line
38 Pressure sensor
40 Armature
42 Solenoid (electromagnet)
47 Bleeding
120 Compressed air feed line
280 Wheel brakes at rear axle HA
400 Wheel brakes in trailer brake system 4
HA Rear axle
VA Front axle
Bp1 Operating phase: Increase in pressure
Bp2 Operating phase: Maintaining pressure or shutting off pressure
Bp3 Operating phase: Reducing pressure/bleeding
p11 Maximum supply pressure of the compressed air accumulator p11
p12 Maximum supply pressure of the compressed air accumulator p21
p_12_mid Median supply pressure
p_18 Driver control pressure
p_22 Pilot-control pressure
p_32 Brake pressure for actuating the wheel brake 29
p_33 Brake pressure for actuating the wheel brake 30
p_34 Fed-through pilot-control pressure; fed through the brake control line 34
p_35 Modulation brake pressure
p_36 Modulation brake pressure
delta_p1 Pressure increase of the pilot-control pressure p_22 in venting phase t1
delta_p2 Pressure reduction in bleeding phase t2
delta_p3 Positive pressure increase
S1 Pilot-control signals
S2 Brake signals from the brake control device 6
S3 Brake signals from the brake control device 6
S1_off Low voltage level
S1_on High voltage level
S_p Braking requirement signal
Sx Braking requirement signal
T Switching period
t1 Switch-on time where S1=1
t2 Switch-off time where S1=0
T_v Total switch-on time
Step St0 Start
Step St1 Automatic vehicle movement dynamics control process or brake control process
Step St2 Determination of the pilot-control brake pressure p_22 by brake control device 6
Step St3 Modulation of the pilot-control brake pressure p_22 by outputting the pilot-control signals S1 via the pilot-control valve 22, preferably by modulation or with the switch-on and switch-off times
Sub-step St3-1 Opening of the pilot-control valve 20 in a venting phase t1 with pressure increase delta_p1 in the pilot-control line 22
Sub-step St3-2 Bleeding of the pilot-control line 22 in each case in a bleeding phase t2 with pressure reduction delta_p2

What is claimed is:

1. A method for controlling a pneumatic brake system of a vehicle, the method including the steps of:
modulating a pilot-control brake pressure by means of an electropneumatic pilot-control valve in venting phases and bleeding phases; and
feeding in the pilot-control pressure via a pilot-control line for outputting a brake pressure to wheel brakes of the vehicle;
wherein the pilot-control valve is modulated from a bled state in alternating venting phases and bleeding phases in order to automatically modulate a median pilot-control pressure level, in such a way that the pilot-control pressure is increased in the venting phases, and decreased in the bleeding phases;
wherein, when an automatic braking process is initiated from a braking-free state, the median pilot-control pressure level is set by means of a plurality of switching periods, each with a venting phase by increasing the pilot-control pressure present in the pilot-control line, and a subsequent bleeding phase by reducing the pilot-control pressure;
wherein the median pilot-control pressure level is set in a setting time which is longer than the switching period.

2. The method as claimed in claim 1, wherein the pilot-control pressure is fed to at least one check valve, via the pilot-control line, in order to output the brake pressure from the check valve to the wheel brakes of the vehicle.

3. The method as claimed in claim 2, wherein the pilot-control pressure which is outputted by the pilot-control valve is subsequently outputted as a fed-through pilot-control pressure to the at least one check valve via a relay valve or via a select-high valve and the relay valve.

4. The method as claimed in claim 2, wherein the check valve is set to the following operating phases by means of brake signals, in order to set the brake pressure:
the open position for increasing the pressure or reducing the pressure via the pilot-control line; and
the closed position for maintaining the pressure, and the bleeding position for decreasing the pressure.

5. The method as claimed in claim 2, wherein in the venting phases, the pilot-control valve feeds through a supply pressure of a first compressed air accumulator to the pilot-control line and the pilot-control pressure which is outputted by the pilot-control valve is supplied to a relay valve, which subsequently supplies a fed-through pilot-control pressure from a second compressed air accumulator to the at least one check valve, wherein the first compressed air accumulator provides a further fed-through pilot control pressure to a further relay valve and a further supply pressure to a further pilot-control valve.

6. The method as claimed in claim 1, wherein the pilot-control pressure is conducted to the wheel brakes via the pilot-control line without the intermediate connection of a check valve.

7. The method as claimed in claim 1, wherein in the venting phases, the pilot-control valve feeds through a supply pressure of a compressed air accumulator to the pilot-control line, and in the bleeding phases, the pilot-control line is connected to an air outlet.

8. The method as claimed in claim 1, wherein the setting time is more than twice as long as the switching period, in particular more than three times as long as the switching period.

9. The method as claimed in claim 1, wherein, when the median pilot-control pressure level is modulated automatically, an armature of the pilot-control valve is moved in the alternating venting phases and bleeding phases.

10. The method as claimed in claim 1, wherein in the setting time, the pilot-control pressure is increased overall in each switching period by virtue of the fact that the pressure increase is greater in the venting phase than the pressure reduction in the subsequent bleeding phase.

11. The method as claimed in claim 1, wherein the method is carried out when automatic braking is initiated without the presence of a driver's request signal.

12. The method as claimed in claim 1, wherein, a plurality of pilot-control valves, in each case a pilot-control pressure level is fed in parallel or independently of one another to in each case at least one brake circuit.

13. A pneumatic brake system for a vehicle, wherein the brake system comprises:
    an electronic brake control device for receiving a driver's braking request signal and for carrying out an automatic brake control method by outputting brake signals and pilot-control brake signals,
    a pilot-control line, brake lines and pneumatic wheel brakes which are connected to the brake lines,
    at least one check valve which is connected directly or indirectly to the pilot-control line, receives a fed-through pilot-control pressure and sets a brake pressure in the connected brake line,
    a pilot-control valve for outputting a pilot-control pressure to the pilot-control line as a function of the pilot-control brake signals,
    wherein, in order to automatically modulate a median pilot-control pressure level in the pilot-control line, the electronic brake control device alternately outputs pilot-control brake signals to the pilot-control valve in a switching period in such a way that the pilot-control pressure level modulates the pilot-control valve from a bled state in alternating venting phases and bleeding phases, and in the process increases the pilot-control pressure in the venting phases and decreases it in the bleeding phases, wherein the electronic brake control device is configured to automatically modulate a median pilot-control pressure level in a setting time which is longer than the switching period.

14. The brake system as claimed in claim 13, wherein the pilot-control valve is connected to:
    the pilot-control line,
    a compressed air accumulator with a supply pressure, and
    a bleeding means.

15. The brake system as claimed in claim 14, further comprising a plurality of brake circuits, at least one of which is selected from the group of: a first brake circuit of a rear axle, a second brake circuit of a front axle, and a trailer brake system, wherein a separate pilot-control valve and a separate pilot-control line, which is connected to the pilot-control valve, are assigned to each brake circuit.

16. The brake system as claimed in claim 15, further comprising a separate compressed air accumulator and a separate relay valve, wherein each of the separate pilot valves is connected to the same one of the separate compressed air accumulators as the other separate pilot valves and each of the separate relay valves is connected to a different one of the separate compressed air accumulators as the other separate relay valves.

17. The brake system as claimed in claim 14, wherein the pilot-control valve is an electrically modulated 3/2 way valve which is connected to the compressed air accumulator, to the pilot-control line and to the bleeding means, and receives the pilot-control signals of the brake control device.

18. The brake system as claimed in claim 13, further comprising:
    a brake pedal,
    a brake valve which is connected by means of the brake pedal and has the purpose of modulating a driver control pressure, and
    a select-high valve,
    wherein the select-high valve passes through the respectively higher input pressure of the pilot-control pressure or of the driver control pressure.

19. The brake system as claimed in claim 13, wherein a relay valve for increasing a quantity of compressed air is connected between the pilot-control valve and the check valves.

20. The brake system as claimed in claim 13, wherein the at least one check valve is embodied as an ABS check valve and can be set to the following operating phases:
    the open position for increasing the pressure or reducing the pressure via the pilot-control line,
    the closed position for maintaining the pressure, and
    the bleeding position for decreasing the pressure.

* * * * *